United States Patent
Staiano

(10) Patent No.: US 6,867,963 B2
(45) Date of Patent: Mar. 15, 2005

(54) DISC DRIVE MOUNTING SYSTEM INCLUDING VIBRATION ISOLATOR AND HEAT SINK

(75) Inventor: Michael W. Staiano, Mead, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/183,301

(22) Filed: Jun. 26, 2002

(65) Prior Publication Data

US 2003/0193778 A1 Oct. 16, 2003

Related U.S. Application Data

(60) Provisional application No. 60/372,759, filed on Apr. 11, 2002.

(51) Int. Cl.[7] .................................................. G06F 1/16
(52) U.S. Cl. ..................... 361/685; 361/687; 312/223.2; 312/332.1; 312/333
(58) Field of Search ................................ 361/685, 687, 361/702, 703, 707, 709; 312/223.1, 223.2, 332.1, 333

(56) References Cited

U.S. PATENT DOCUMENTS

| | | | |
|---|---|---|---|
| 4,713,714 A | * 12/1987 | Gatti et al. | 360/137 |
| 5,510,954 A | 4/1996 | Wyler | 361/685 |
| 5,596,483 A | 1/1997 | Wyler | 361/683 |
| 5,886,851 A | 3/1999 | Yamazaki et al. | 360/97.02 |
| 5,898,572 A | 4/1999 | Shennib et al. | 361/713 |
| 5,927,386 A | 7/1999 | Lin | 165/80.3 |
| 6,088,221 A | * 7/2000 | Bolognia | 361/685 |
| 6,185,097 B1 | 2/2001 | Behl | 361/695 |
| 6,233,148 B1 | * 5/2001 | Shen | 361/695 |
| 6,243,262 B1 | 6/2001 | Koo et al. | 361/687 |
| 6,320,723 B1 | 11/2001 | Bernett | 360/97.02 |
| 6,333,849 B1 | 12/2001 | Donahoe et al. | 361/687 |
| 6,339,532 B1 | * 1/2002 | Boulay et al. | 361/685 |
| 6,373,696 B1 | 4/2002 | Bolognia et al. | 361/687 |
| 6,377,455 B1 | 4/2002 | Nelik | 361/687 |
| 6,434,000 B1 | * 8/2002 | Pandolfi | 361/685 |
| 6,618,246 B2 | * 9/2003 | Sullivan et al. | 361/685 |

* cited by examiner

Primary Examiner—Lynn Feild
Assistant Examiner—Anthony Q. Edwards
(74) Attorney, Agent, or Firm—Fish & Richardson P.C., P.A.

(57) ABSTRACT

A disc drive mounting system includes a first elongated thermally conductive mounting member having spaced apart first and second mounting areas that can be secured to the frame and a mid portion between the mounting areas. The mid portion of the first mounting member can extend along a first side of a disc drive. A first set of thermally conductive fins extend from the first mounting member away from a disc drive when the disc drive is fastened to the mid portion. First and second mechanical vibration isolators are secured to the first and second mounting areas, respectively.

23 Claims, 3 Drawing Sheets

DISC DRIVE MOUNTING SYSTEM INCLUDING VIBRATION ISOLATOR AND HEAT SINK

RELATED APPLICATIONS

This application claims priority of U.S. provisional application Ser. No. 60/372,759, filed Apr. 11, 2002.

FIELD OF THE INVENTION

This application relates generally to disc drives and more particularly to a disc drive mounting system.

BACKGROUND OF THE INVENTION

Hard drives are currently used in many consumer electronic devices other than personal computers. For example, they are used in personal video recorders, cable set top boxes, external storage devices, and audio jukeboxes. Many concerns arise when integrating a disc drive into a consumer electronic device. For example, an operating temperature range of the disc drive should be maintained, acoustic emission from the electronic device should be minimized, and the effects of external shocks and vibrations on the disc drive should be minimized.

Designing a disc drive mounting system to address one such concern can adversely affect another. For example, a system fan installed to cool the disc drive can produce unwanted acoustic emissions. Additionally, hard mounting the disc drive directly to the frame of the electronic device may facilitate heat transfer from the disc drive. However, hard mounting directly to the frame may also facilitate acoustic emissions from the disc drive and the transfer of shocks and vibrations to the disc drive.

Accordingly there is a need for a disc drive mounting system that increases heat transfer away from a disc drive, decreases acoustic emissions from the disc drive, and decreases the effects of external shocks and vibrations on the disc drive. The present invention provides a solution to this and other problems, and offers other advantages over the prior art.

SUMMARY OF THE INVENTION

Against this backdrop the present invention has been developed. A disc drive mounting system according to an embodiment of the present invention includes a first elongated thermally conductive mounting member having spaced apart first and second mounting areas that can be secured to the frame and a mid portion between the mounting areas. The mid portion of the first mounting member can extend along a first side of a disc drive. A first set of thermally conductive fins extend from the first mounting member away from a disc drive when the disc drive is fastened to the mid portion. First and second mechanical vibration isolators are secured to the first and second mounting areas, respectively.

Stated another way, a disc drive mounting system fastening a disc drive having a base and a top cover that cooperate to form an internal disc drive environment to a frame according to an embodiment of the present invention includes a first thermally conductive mounting member. The first mounting member has first and second mounting areas that are secured to a frame, with the first mounting member having a mid portion between the mounting areas secured to the disc drive base along a first side of the disc drive. A first set of thermally conductive fins is secured to the first mounting member and extends from the first mounting member away from the disc drive. First and second mechanical vibration isolators are respectively seated between the first and second mounting areas of the first mounting member and the frame.

These and various other features as well as advantages which characterize the present invention will be apparent from a reading of the following detailed description and a review of the associated drawings.

DETAILED DESCRIPTION

Figure 1:
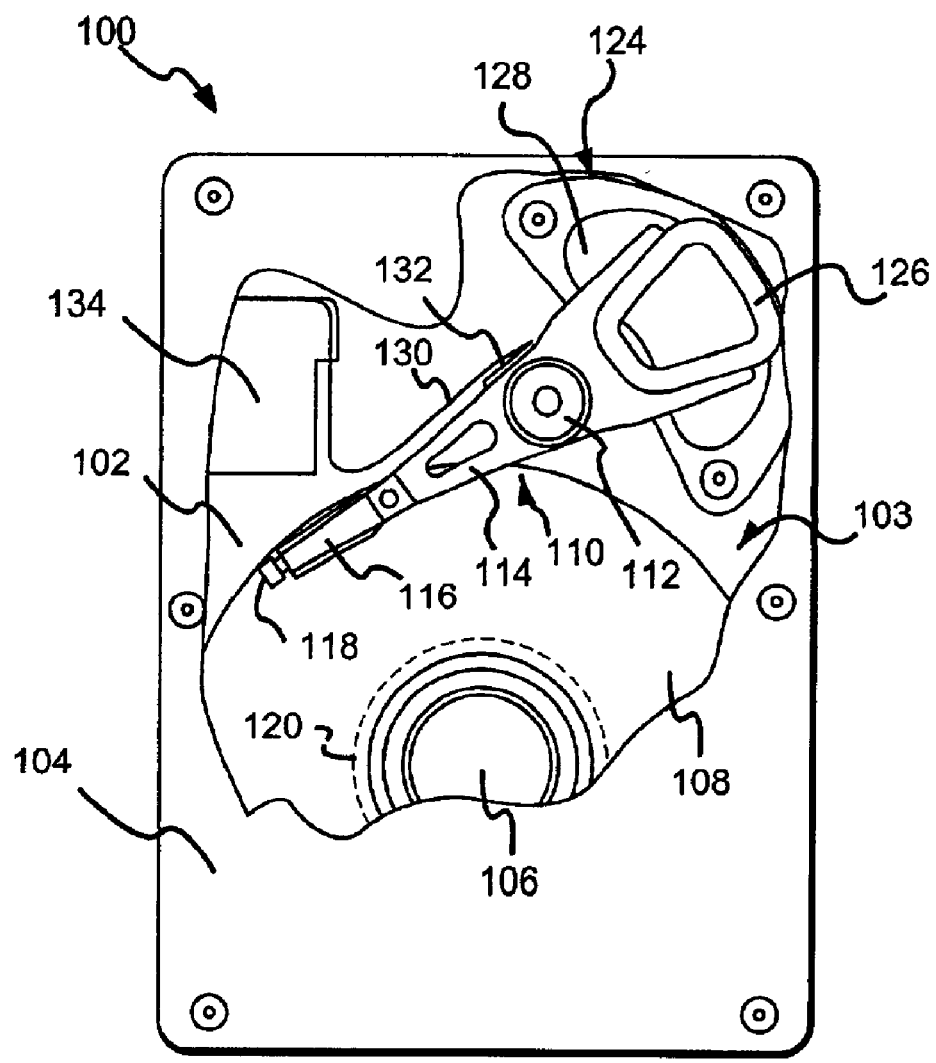
FIG. 1 is a top plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form a disc drive housing 103 that encloses an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
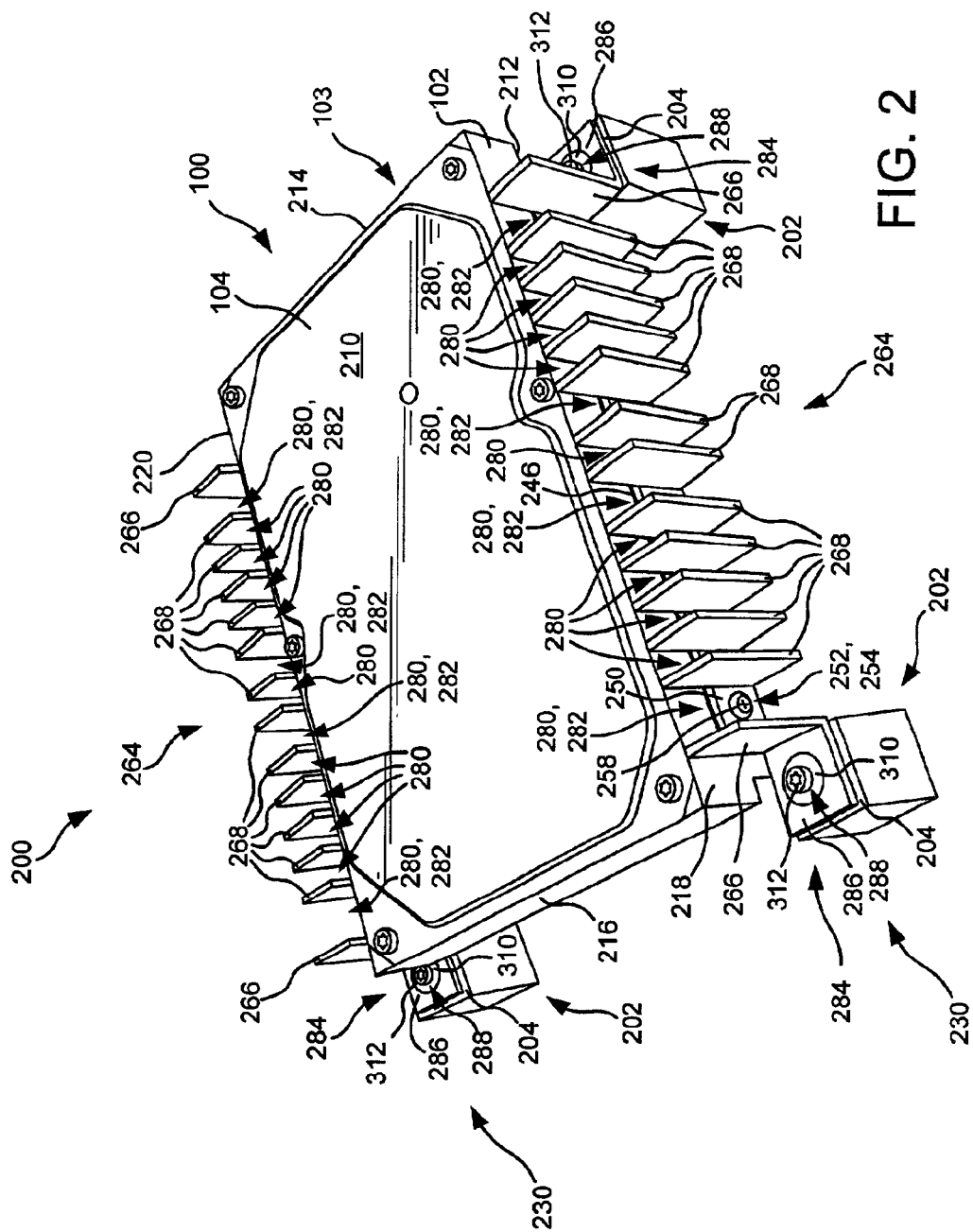
FIG. 2 is a perspective view of a mounting system for mounting a disc drive on a frame in accordance with a preferred embodiment of the present invention.
Figure 3:
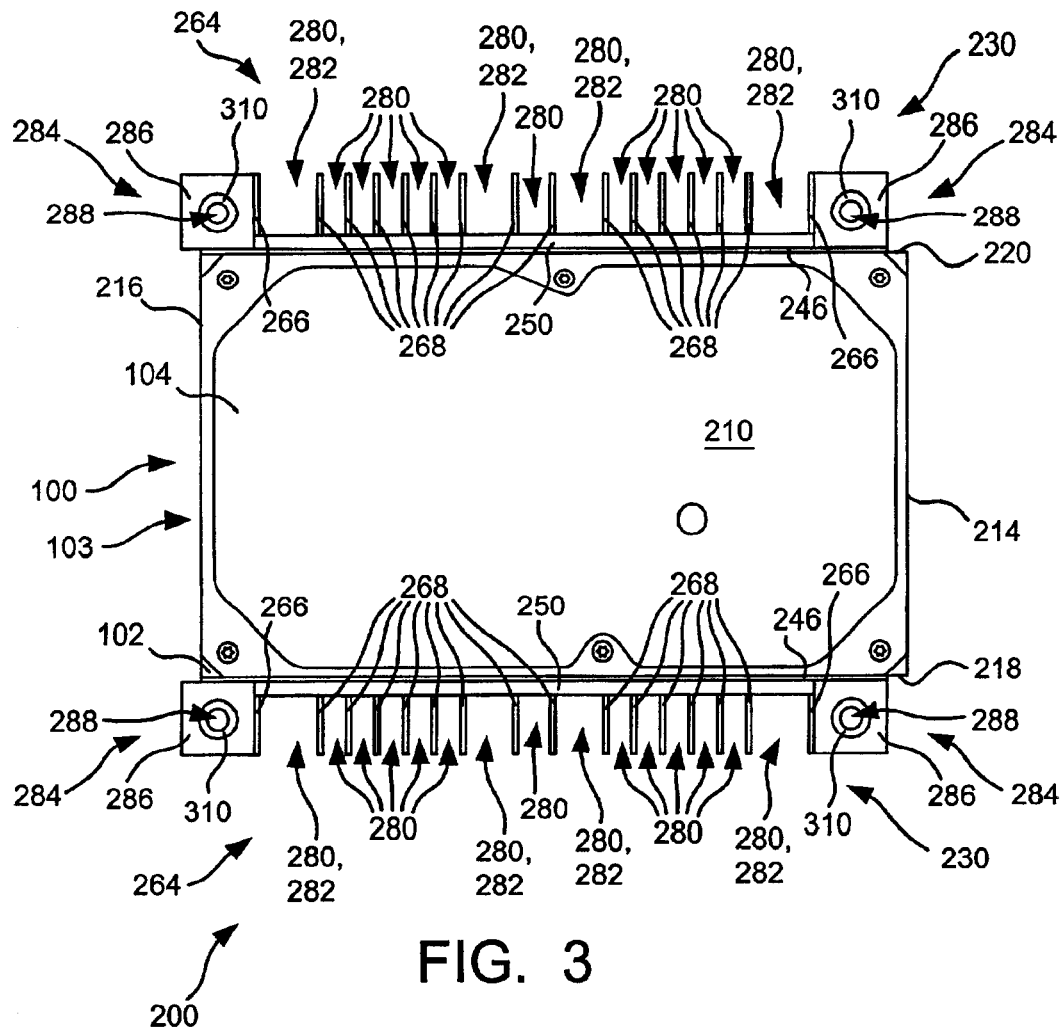
FIG. 3 is a top plan view of the mounting system of FIG. 2.
Figure 4:
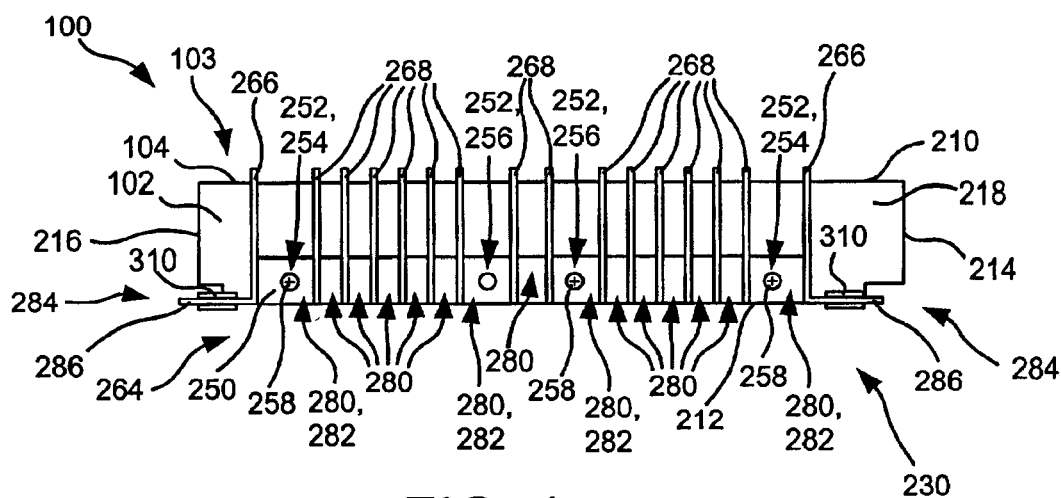
FIG. 4 is a right side view of the mounting system of FIG. 2.

A disc drive mounting system 200 illustrated in FIGS. 2–4 mounts the disc drive 100 to a frame 202, and specifically to four mounting surfaces 204 of the frame 202. The housing 103 of the disc drive 100 forms a substantially rectangular-shaped box having a horizontal major top surface 210 along the top cover 104 and an opposing major bottom surface 212. An end of the base 102 forms a vertical distal end 214 of the housing 103, extending between the top surface 210 and the bottom surface 212 adjacent the voice coil motor 124 and the actuator assembly 110 (FIG. 1). An opposite end of the base 102 forms a vertical proximal end 216, extending between the top surface 210 and the bottom surface 212 adjacent the discs 108 (FIG. 1). Finally, a right side and an opposing left side 220 extend between the distal end 214 and the proximal end 216.

A mounting adapter or mounting member 230 extends along each side 218 and 220, and a thermally conductive interface layer 246 is preferably disposed between each mounting adapter 230 and the respective side 218 or 220 of the housing 103. More specifically, each mounting adapter 230 has a mid portion that includes a bar 250 that extends along the respective side 218 or 220, abutting the respective interface layer 246. Each bar 250 defines a set of disc drive mounting holes 252 that extend substantially perpendicular to the sides 218 and 220 and align with mounting holes (not shown) in the base 102 of the disc drive 100.

The mounting holes 252 of each bar 250 are preferably configured to align with the mounting holes in either side 218, 220 of the base 102, even if the mounting holes in the base 102 are not symmetrically spaced. In a preferred embodiment, where the base 102 defines a pair of end mounting holes and a middle mounting hole that is offset from a midpoint between the end mounting holes, each bar 250 defines four mounting holes 252. A pair of end mounting holes 254 align with end mounting holes in either the right side 218 or the left side 220. However, only one of the two middle mounting holes 256 aligns with the middle mounting hole in the right side 218 of the base 102. The other middle mounting hole 256 aligns with the middle mounting hole in the left side 220 of the base 102. Thus, the mounting adapters 230 may be used interchangeably on the right side 218 and the left side 220. Disc drive fasteners 258, which are preferably screws, extend through the disc drive mounting holes 252 and into the mounting holes in the base 102 to secure each bar 250 to the base 102, and thus secure the associated mounting adapter 230 to the base 102.

Each mounting adapter 230 additionally includes a set of substantially rectangular fins 264 that are preferably arranged in a row along the bar 250 of the mounting adapter 230. Each fin 264 is preferably oriented transversely to the bar 250, such that each fin 264 extends away from the bar 250 and from the disc drive 100. Each fin 264 preferably has a bottom edge that is substantially even with the bottom of the bar 250, but each fin extends upwardly beyond the height of the bar 250, and even beyond the height of the disc drive 100.

Each set of fins 264 preferably includes a pair of end fins 266, each secured to a terminus of the bar 250, and intermediate fins 268 secured along the bar 250 between the end fins 266. The fins 264 define vertical airflow channels 280 interspersed between the fins 264 that allow air or other gases to flow vertically along the fins 264. In a preferred embodiment, the airflow channels 280 include fastener access channels 282 that are wider than the remainder of the airflow channels 280. The fastener access channels 282 facilitate access for securing and removing the disc drive fasteners 258.

Each end of each mounting adapter 230 includes a frame mounting area 284 that is configured to facilitate mounting of the mounting adapter 230 to the mounting surfaces 204 of the frame 202. Each mounting area 284 includes a substantially rectangular shaped horizontal frame mounting plate 286 that extends longitudinally from a bottom edge of an adjacent end fin 266. Each mounting plate 286 defines a vertically extending frame mounting hole 288. An annular vibration isolator 310 is seated within each mounting hole 288. Each vibration isolator 310 preferably extends above and below the mounting plate 286 and includes hub seated within the mounting hole 288 and a pair of annular flanges, with one annular flange extending outwardly from the hub along the top of the mounting plate 286 and another annular flange extending outwardly from the hub along the bottom of the mounting plate 286. Fasteners 312, which are preferably screws, extend through the hubs of the respective vibration isolators 310, securing the vibration isolators to the frame mounting surfaces 204, and thereby securing the mounting adapters 230 and the disc drive 100 to the frame 202.

Each mounting adapter 230, including the bar 250, the fins 264, and the mounting plates 286, is preferably a unitary cast aluminum member. The interface layer 246 is preferably formed of a compliant thermally conductive material. In a preferred embodiment, the interface layer 246 is a layer of boron nitride filled silicone elastomer. The isolators 310 are preferably made of a highly damped material, such as a highly damped thermoplastic vinyl material.

Heat produced by the disc drive 100 is preferably transferred from the disc drive base 102 through the interface layer 246, through the bar 250, and into the fins 264, where it dissipates into the surrounding environment. The vertically extending airflow channels 280 facilitate airflow across the fins 264, and thus facilitate the transfer of heat from the fins 264 by convection. This is especially true because air that is rising as it heats will travel vertically through the airflow channels 280. The mounting system 200 is preferably positioned within an electronic device in a manner that will facilitate flow through the airflow channels 280. For example, the mounting system 200 may be positioned between upper and lower vents in the housing of an electronic device. Notably, however, the fins 264 could be oriented in some other manner, resulting in different orientations for the airflow channels 280. Tests have indicated that disc drives mounted with the mounting adapters 230 typically operate from about 6 to 8 degrees Centigrade cooler than disc drives in similar environments without the mounting adapters 230.

The isolators 310 are disposed between the mounting adapters 230 and the frame 202 so that any vibrations must pass through the isolators 310 if they are to pass between the disc drive 100 and the frame 202. The isolators 310 thus minimize the transfer of acoustical vibrations from the disc drive 100. The isolators 310 also minimize the transfer of external vibrations and shocks from the frame 202 to the disc drive 100. Additionally, the mounting adapters 230 extend the positions of the isolators 310 outwardly from the disc drive 100 and thereby provide a wider mounting stance for the disc drive 100, which reduces rotational vibrations of the disc drive 100.

An embodiment of the present invention may be alternatively described as a disc drive mounting system (such as 200). The mounting system includes a first elongated thermally conductive mounting member (such as 230) having spaced apart first and second mounting areas (such as 284) that can be secured to the frame and a mid portion between the mounting areas. The mid portion of the first mounting member can extend along a first side (such as 218) of a disc drive (such as 100). A first set of thermally conductive fins (such as 264) extend from the first mounting member away from a disc drive when the disc drive is fastened to the mid portion. First and second mechanical vibration isolators (such as 310) are secured to the first and second mounting areas, respectively.

The mid portion of the mounting member preferably includes a metallic bar (such as 250) adapted to extend along the first side of the disc drive. The fins may also be metallic, and may be integrally formed with the metallic bar. The first set of fins preferably includes a row of fins each oriented substantially transversely to the metallic bar. Additionally, in a preferred embodiment the fins define a plurality of vertical channels (such as 280) interspersed between the fins.

The mounting system may further include a thermally conductive layer (such as 246) positioned between the mounting member and a disc drive when the disc drive is fastened to the mid portion of the first mounting member. Also, the first mounting area of the first mounting member preferably defines a first end hole (such as 288) receiving the first vibration isolator and the second mounting area of the first mounting member preferably defines a second end hole (such as 288) receiving the second vibration isolator. The first and second vibration isolators each preferably include an annular damping member. The first vibration isolator may receive a first fastener (such as 312) operable to secure the first vibration isolator to a frame (such as 202) and the second vibration isolator may receive a second fastener (such as 312) operable to secure the second vibration isolator to the frame. Additionally, the first mounting member preferably defines a plurality of holes (such as 252) configured to receive fasteners that secure the first mounting member to the disc drive.

The mounting system may further include a second thermally conductive mounting member (such as 230) that has spaced apart first and second mounting areas (such as 284) that can be secured to the frame and a mid portion between the mounting areas. The mid portion of the second mounting member is able to extend along a second side (such as 220) of the disc drive opposite the first side of the disc drive. A second set of thermally conductive fins (such as 264) extend from the second mounting member away from the a disc drive when the disc drive is fastened to the mid portion. Additionally, third and fourth mechanical vibration isolators (such as 310) are secured to the first and second mounting areas, respectively.

Stated another way, an embodiment of the present invention may be alternatively described as a disc drive mounting system (such as 200) fastening a disc drive (such as 100) having a base (such as 102) and a top cover (such as 104) that cooperate to form an internal disc drive environment to a frame. A first thermally conductive mounting member (such as 230) has first and second mounting areas (such as 284) that are secured to a frame (such as 202), with the first mounting member having a mid portion between the mounting areas secured to the disc drive base along a first side (such as 218) of the disc drive. A first set of thermally conductive fins (such as 264) is secured to the first mounting member and extends from the first mounting member away from the disc drive. First and second mechanical vibration isolators (such as 310) are respectively seated between the first and second mounting areas of the first mounting member and the frame.

Stated yet another way, an embodiment of the present invention may be alternatively described as a disc drive mounting system (such as 200) including a disc drive (such as 100) having a housing (such as 103) that defines an internal disc drive environment. The mounting system also includes means supporting the disc drive on a frame for conducting thermal energy away from the housing of the disc drive and for inhibiting vibrations from passing between the housing and a frame (such as 202) that supports the housing.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the mounting areas could have many different configurations, including configurations where the mounting plates are oriented vertically, rather than horizontally. Numerous other changes may be made which will readily suggest themselves to those skilled in the art and which are encompassed in the spirit of the invention disclosed and as defined in the appended claims.

What is claimed is:

1. A disc drive mounting system for fastening a disc drive to a support frame, the system comprising:

a first elongated thermally conductive mounting member having spaced apart first and second mounting areas that are adapted to be secured to the frame and a mid portion between the mounting areas, the mid portion of the first mounting member adapted to extend along a first side of a disc drive;

a first set of substantially vertical, thermally conductive fins extending from the mid portion of the first mounting member away from a disc drive when the disc drive is fastened to the mid portion;

a first mechanical vibration isolator secured to the first mounting area of the first mounting member;

a second mechanical vibration isolator secured to the second mounting area of the first mounting member; and a thermally conductive layer positioned between the first mounting member and a disc drive when the disc drive is fastened to the mid portion of the first mounting member.

2. The system of claim 1, wherein the mid portion of the first mounting member comprises a metallic bar adapted to extend along the first side of the disc drive.

3. The system of claim 2, wherein the fins are metallic and are integrally formed with the metallic bar.

4. The system of claim 2, wherein the first set of fins comprises a row of fins each oriented substantially transversely to the metallic bar.

5. The system of claim 4, wherein the fins define a plurality of vertical channels interspersed between the fins.

6. The system of claim 1, wherein the first mounting area of the first mounting member defines a first end hole receiving the first vibration isolator and the second mounting area of the first mounting member defines a second end hole receiving the second vibration isolator.

7. The system of claim 6, wherein the first and second vibration isolators each comprise an annular damping member.

8. The system of claim 7, wherein the first vibration isolator receives a first fastener operable to secure the first vibration isolator to a frame and the second vibration isolator receives a second fastener operable to secure the second vibration isolator to the frame.

9. The system of claim 1, wherein the first mounting member defines a plurality of holes configured to receive fasteners that secure the first mounting member to the disc drive.

10. The system of claim 1, further comprising:
a second elongated thermally conductive mounting member having spaced apart first and second mounting areas adapted to be secured to the frame and a mid portion between the mounting areas of the second mounting member, the mid portion of the second mounting member adapted to extend along a second side of the disc drive opposite the first side of the disc drive;
a second set of thermally conductive fins extending from the mid portion of the second mounting member away from a disc drive when the disc drive is fastened to the mid portion;
a third mechanical vibration isolator secured to the first mounting area of the second mounting member; and
a fourth mechanical vibration isolator secured to the second mounting area of the second mounting member.

11. A disc drive mounting system fastening a disc drive having a base and a top cover that cooperate to form an internal disc drive environment to a supporting frame, the system comprising:
a first thermally conductive mounting member having first and second mounting areas that are secured to the frame, the first mounting member having a mid portion between the mounting areas secured to the disc drive base along a first side of the disc drive, wherein the mid portion of the first mounting member comprises an elongated metallic bar extending along the first side of the disc drive;
a first set of substantially vertical, thermally conductive fins extending from the first mounting member away from the disc drive;
a first mechanical vibration isolator seated between the first mounting area of the first mounting member and the frame;
a second mechanical vibration isolator seated between the second mounting area of the first mounting member and the frame; and
a thermally conductive layer between the metallic bar and the disc drive base.

12. The system of claim 11, wherein the fins are metallic and are integrally formed with the metallic bar.

13. The system of claim 12, wherein the first set of fins is a row of fins each extending substantially transversely from the metallic bar, the fins defining a plurality of vertical channels interspersed between the fins.

14. The system of claim 11, wherein the first mounting area of the first mounting member defines a first end hole receiving the first vibration isolator and the second mounting area of the first mounting member defines a second end hole receiving the second vibration isolator.

15. The system of claim 14, wherein the first and second vibration isolators each comprise an annular damping member.

16. The system of claim 15, wherein the first vibration isolator receives a first fastener securing the first vibration isolator to the frame and the second vibration isolator receives a second fastener securing the second vibration isolator to the frame.

17. The system of claim 11, wherein the first mounting member defines a plurality of holes receiving fasteners that secure the first mounting member to the disc drive.

18. The system of claim 11, further comprising:
a second thermally conductive mounting member having a first mounting area and a second mounting area, the second mounting member having a mid portion between the first and second mounting areas secured to the base along a second side of the disc drive opposite the first side of the disc drive;
a second set of thermally conductive fins extending from the second mounting member away from the base;
a third mechanical vibration isolator secured between the first mounting area of the second mounting member and the frame; and
a fourth mechanical vibration isolator secured between the second mounting area of the second mounting member and the frame.

19. A disc drive mounting system comprising:
a disc drive having a housing that defines an internal disc drive environment;
means for conducting thermal energy away from the housing of the disc drive and for inhibiting vibrations from passing between the housing and a frame that supports the housing comprising a mounting adapter;
a thermally conductive layer between the mounting adapter and the disc drive base, wherein the means for conducting and inhibiting comprises
a first thermally conductive mounting adapter having first and second mounting areas secured to the frame, the first mounting adapter secured to the disc drive housing and extending along a first side of the disc drive between the first mounting area and the second mounting area;
a first set of thermally conductive fins secured to the first mounting adapter and extending from the first mounting adapter away from the disc drive;
a first mechanical vibration isolator seated between the first mounting area of the first adapter and the frame; and
a second mechanical vibration isolator seated between the second mounting area of the first adapter and the frame.

20. The system of claim 19, wherein the mounting adapter comprises a metallic bar extending along the first side of the disc drive and the first set of fins is a row of fins each extending substantially transversely from the metallic bar, the fins defining a plurality of vertical channels interspersed between the fins.

21. The system of claim 19, further comprising:
a second thermally conductive mounting adapter having a first mounting area and a second mounting area, the second mounting adapter secured to the housing and extending between the first and second mounting areas of the second mounting adapter along a second side of the base opposite the first side of the base;
a second set of thermally conductive fins secured to the second mounting adapter and extending from the second mounting adapter away from the base;
a third mechanical vibration isolator secured to the first mounting area of the second mounting adapter; and a fourth mechanical vibration isolator secured to the second mounting area of the second mounting adapter.

22. A disc drive mounting system for fastening a disc drive to a support frame, the system comprising:

a first elongated thermally conductive mounting member having spaced apart first and second mounting areas that are adapted to be secured to the frame and a mid portion between the mounting areas, the mid portion of the first mounting member adapted to extend along a first side of a disc drive;

a first set of substantially vertical thermally conductive fins extending from the mid portion of the first mounting member away from a disc drive when the disc drive is fastened to the mid portion;

a first mechanical vibration isolator secured to the first mounting area of the first mounting member;

a second mechanical vibration isolator secured to the second mounting area of the first mounting member; and a thermally conductive layer positioned between the first mounting member and a disc drive when the disc drive is fastened to the mid portion of the first mounting member.

23. A disc drive mounting system fastening a disc drive having a base and a top cover that cooperate to form an internal disc drive environment to a supporting frame, the system comprising:

a first thermally conductive mounting member having first and second mounting areas that are secured to the frame, the first mounting member having a mid portion between the mounting areas secured to the disc drive base along a first side of the disc drive;

a first set of substantially vertical thermally conductive fins extending from the first mounting member away from the disc drive;

a first mechanical vibration isolator seated between the first mounting area of the first mounting member and the frame;

a second mechanical vibration isolator seated between the second mounting area of the first mounting member and the frame; and a thermally conductive layer between the mid portion of the first mounting member and the disc drive base.

* * * * *